Dec. 8, 1964     J. C. BOONE     3,160,221
HILLSIDE COMBINE WITH SPECIFIC AXLE STRUCTURE
Filed Sept. 12, 1961     5 Sheets-Sheet 1

Inventor
Jerry C. Boone
By W. Gerald
Attorney

Dec. 8, 1964   J. C. BOONE   3,160,221
HILLSIDE COMBINE WITH SPECIFIC AXLE STRUCTURE
Filed Sept. 12, 1961   5 Sheets-Sheet 2

Inventor
Jerry C. Boone
By W. Gerald
Attorney

Dec. 8, 1964   J. C. BOONE   3,160,221
HILLSIDE COMBINE WITH SPECIFIC AXLE STRUCTURE
Filed Sept. 12, 1961   5 Sheets-Sheet 3

Inventor
Jerry C. Boone
By W. [signature]
Attorney

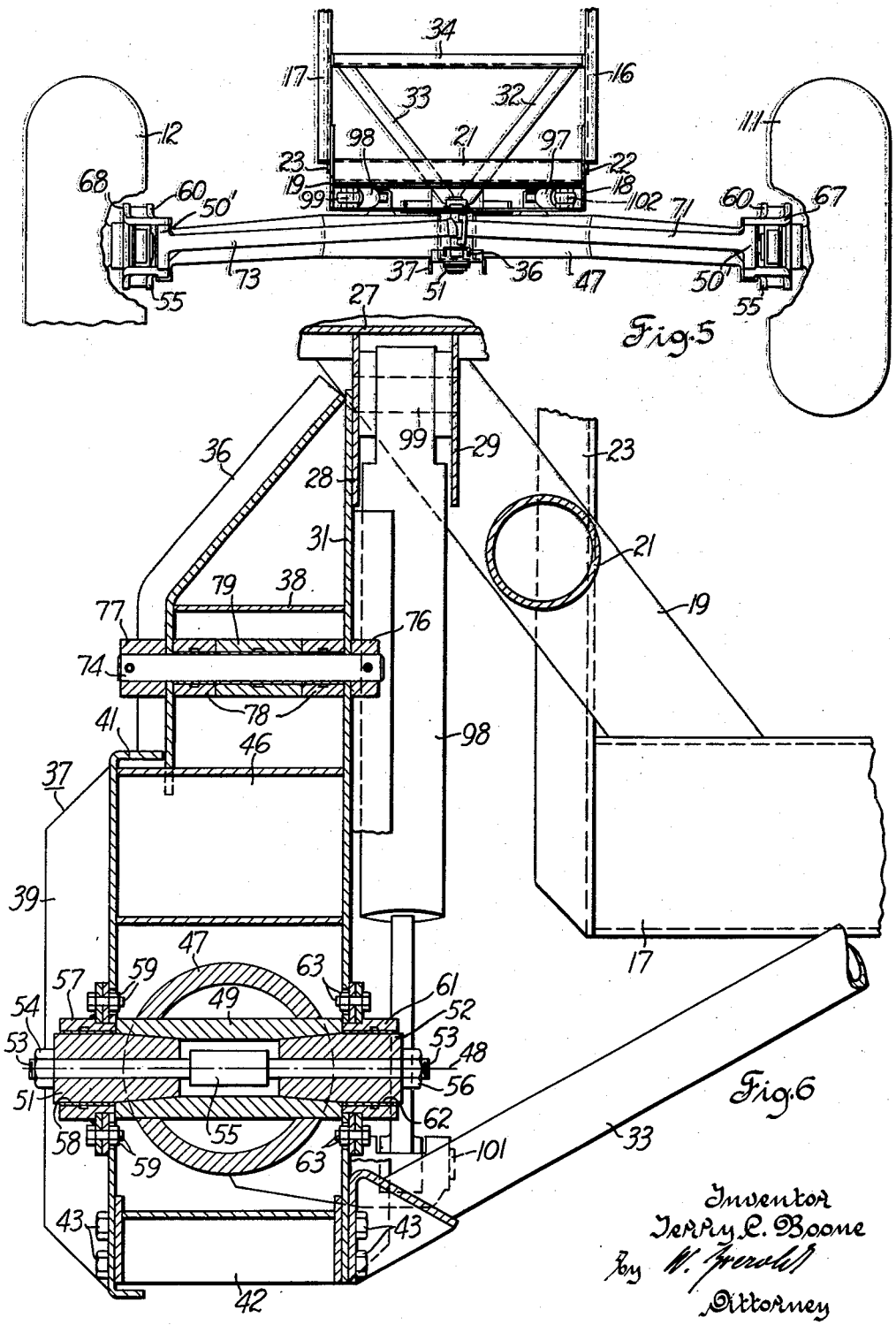

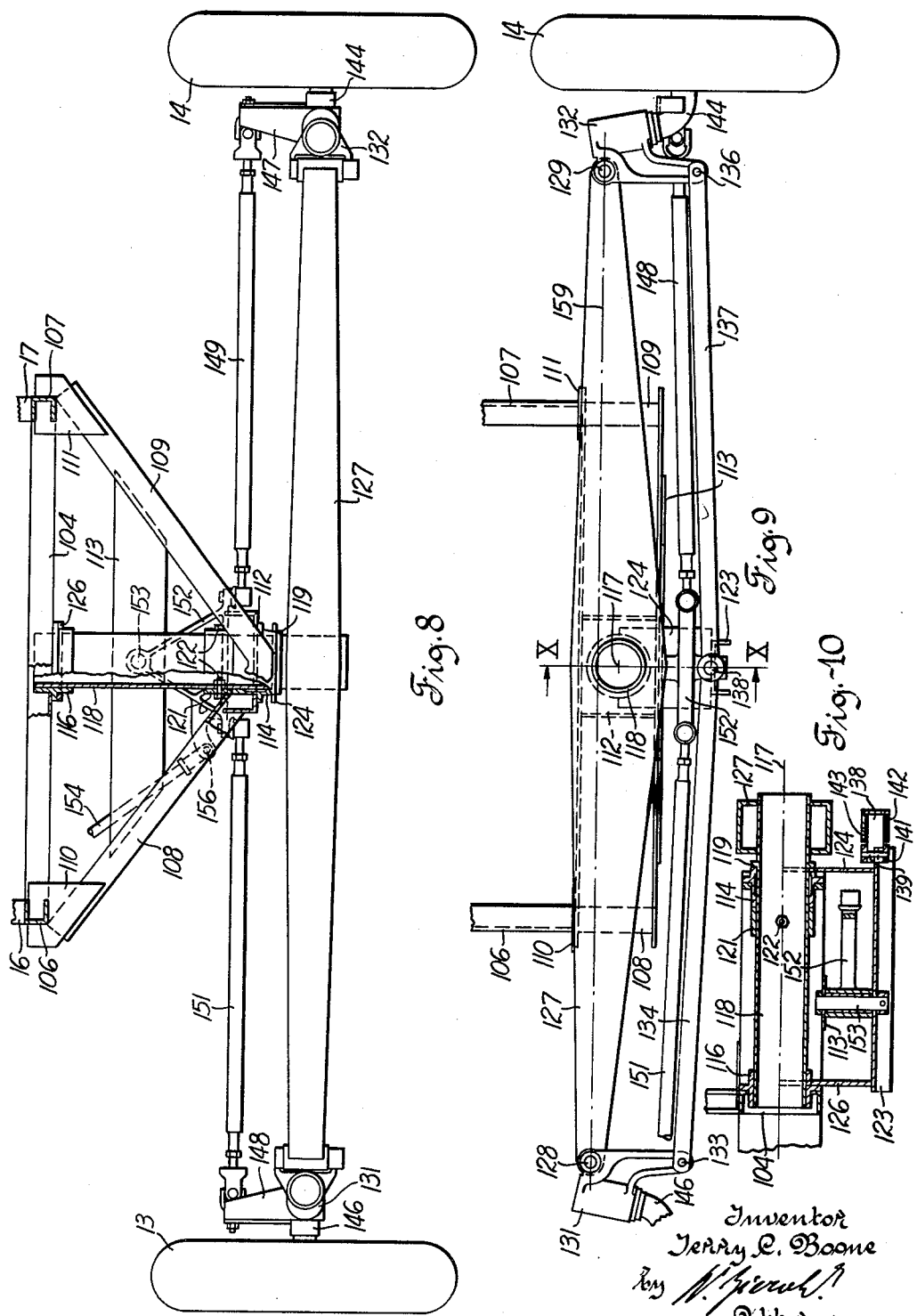

United States Patent Office 3,160,221
Patented Dec. 8, 1964

3,160,221
HILLSIDE COMBINE WITH SPECIFIC AXLE
STRUCTURE
Jerry C. Boone, Independence, Mo., assignor to Allis-Chalmers Manufacturing Company, Milwaukee, Wis.
Filed Sept. 12, 1961, Ser. No. 137,574
1 Claim. (Cl. 180—41)

The invention relates to hillside combines and similar vehicles which are equipped with vertically adjustable wheels in order to keep the vehicle body in a normal upright position during operation on a hillside. More particularly, the invention relates to such a vehicle wherein a supporting wheel or wheels at the uphill side of the main body may be raised and a supporting wheel or wheels at the downhill side of the main body may be lowered in order to maintain the main body in its normal upright position during travel of the vehicle on laterally sloping ground.

An ever present hazard during the operation of a hillside combine on laterally sloping ground is a tire blowout or other failure of the running gear at the downhill side of the machine. The drive wheels of self-propelled hillside combines are usually located in front and the steering wheels in the rear, and the tires of the power driven front wheels are usually of much larger size in diameter and width than the rear wheels. The danger of the machine turning over sideways on a hillside is therefore particularly serious if a failure, such as a tire blowout or axle break, occurs at the propelling wheel on the downhill side of the machine. A similar failure at the rear wheel on the downhill side of the machine is normally less apt to unbalance the machine completely so that it would fall over and endanger the operator.

Generally, it is an object of the invention to minimize the mentioned hazard and particularly the likelihood of a tire or axle failure at the propelling wheel on the downhill side of a hillside combine.

More specifically, it is an object of the invention to provide an improved weight distributing system for a hillside combine which will transmit weight of the vehicle body to a pair of laterally spaced supporting wheels in such a manner that both wheels will carry substantially equal parts of said weight during travel of the vehicle on level ground, and so that the uphill wheel will carry a larger portion of said weight than the downhill wheel during travel of the vehicle on laterally sloping ground.

A further object of the invention is to provide an improved weight distributing system of the mentioned character which will be operative irrespective of whether the hillside slopes upwardly to the right or upwardly to the left of an operator on the vehicle.

A still further object of the invention is to provide an improved weight distributing system of the mentioned character which is extremely simple in principle and construction, and which lends itself to manufacture at relatively low costs.

These and other objects and advantages are attained by the present invention, various novel features of which will be apparent from the description herein of an embodiment of the invention, and will be set forth in the appended claim.

Referring to the accompanying drawings:

FIG. 5 is a top view of the axle structure shown in FIG. 3 with parts broken away and shown in section;

FIG. 6 is an enlarged section on line VI—VI of FIG. 3;

FIG. 8 is an enlarged top view of the rear axle structure of the combine shown in FIG. 1, parts in FIG. 8 being broken away and shown in section;

FIG. 9 is a rear elevation of the structure shown in FIG. 8, parts shown in FIG. 8 being broken away in FIG. 9;

FIG. 10 is a section on line X—X of FIG. 9; and

Figure 1:
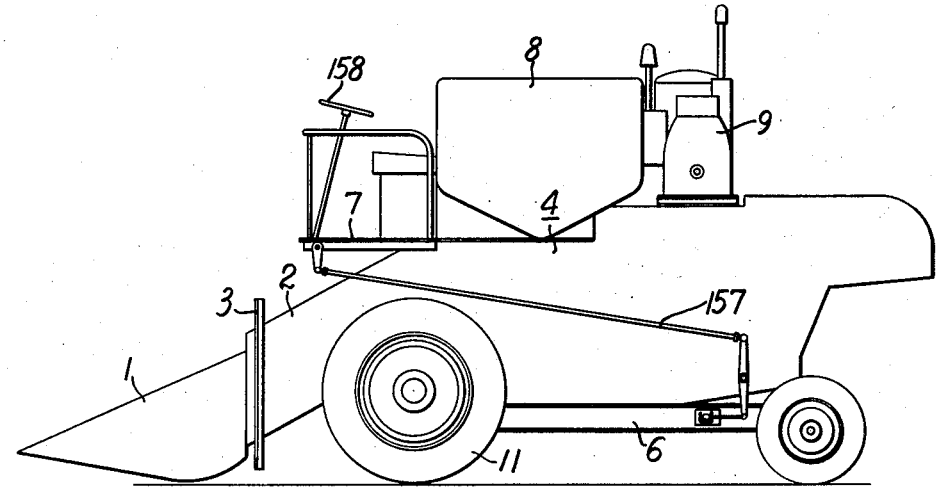
FIG. 1 is a schematic side elevation of a hillside combine.
Figure 2:
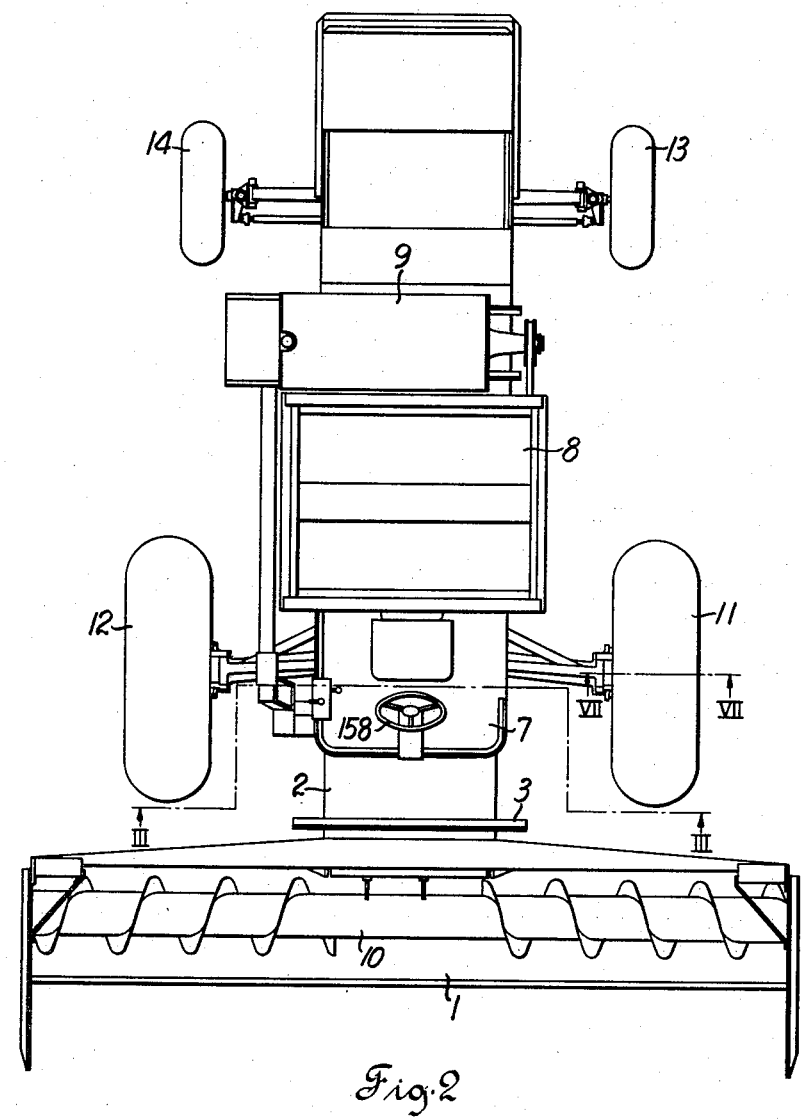
FIG. 2 is a top view of the combine shown in FIG. 1.

In FIG. 1, conventional components of a hillside combine are shown in general outline and include a header 1, thresher housing 2, swivel joint 3 between the header and thresher housing, separator housing 4, vehicle frame 6, operator's station 7, grain bin 8 and engine 9. A conventional auger 10 of the header is shown in FIG. 2, and other conventional components and accessories such as a header reel, straw spreader, bin unloader and access ladders have been omitted in FIGS. 1 and 2 for the sake of clarity and simplification.

The forward end of the vehicle frame 6 is supported on a pair of power driven propelling wheels 11 and 12 by means of an articulated front axle structure which will be more fully described hereinbelow, and the rear end of the vehicle frame 6 is supported on a pair of transversely spaced steerable rear wheels 13 and 14 by means of an articulated rear axle structure which will also be described more fully hereinbelow.

Referring to FIGS. 5 and 6, the vehicle frame 6 comprises a pair of transversely spaced horizontally extending side sills 16 and 17 which are connected with each other by transverse braces in the usual manner. Rigidly connected with the forward ends of the side sills 16 and 17 are a pair of forwardly and upwardly extending side plates 18 and 19 which are cross connected by a tubular brace 21. Vertical front corner posts 22 and 23 of the vehicle frame are rigidly secured at their lower ends to the forward ends of the side sills 16 and 17, and the side plates 18 and 19 are also secured to the inner sides of the corner posts 22 and 23, respectively. The upper forward ends of the side plates 18 and 19 are secured to vertical side walls 24 and 26 (FIG. 3) of the separator housing 4. A bottom wall 27 of the separator housing 4 extends horizontally between the side walls 24 and 26, and secured to the underside of the bottom wall 27 are a pair of parallel transversely extending cross plates 28 and 29 (FIG. 6). Secured to the center portion of the forward cross plate 28 is a downwardly extending bracket plate 31 which is rigidly connected at its lower end with the apex of a V-brace comprising rearwardly diverging side arms 32 and 33 (FIG. 5). As shown in FIG. 5, the rear ends of the side arms 32 and 33 are secured to a cross brace 34 which extends transversely between the side sills 16 and 17.

Secured to the forward side of the bracket plate 31 are an upper angular brace 36 and a lower bearing box 37. The brace 36 is formed of channel iron bent into angular shape so as to present an upper portion which extends forwardly and downwardly from the upper edge of the plate 31, and a lower portion which extends vertically and at a forward distance from the bracket plate 31. The upper end of the brace 36 is welded to the upper end of the plate 31, and a spacer plate 38 is secured between the plate 31 and the vertical portion of the brace 36.

Figure 4:
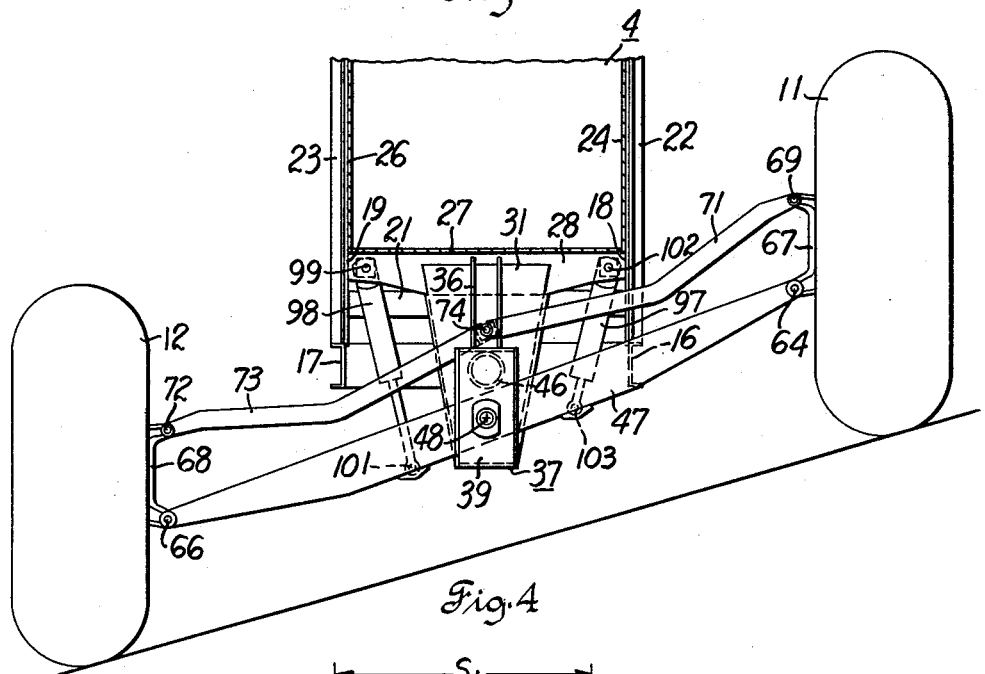
FIG. 4 is a view similar to FIG. 3, but showing the axle structure in a different condition of adjustment.

The bearing box 37 at the forward side of the bracket plate 31 comprises a channel section 39 which is connected to the lower end of the brace 36 and extends downwardly therefrom. The web of the channel section 39 is bent backward at its upper end to form a rearwardly extending flange portion 41 which is welded to the flanges and web of the channel iron 36. As shown in FIG. 4, the channel section 39 is of substantially greater transverse width than the channel 36 and, as shown in FIG. 6, a plate metal spacer structure 42 is removably secured as by bolts 43 between the lower end of the bracket plate 31 and the channel section 39. A spacer tube 46 is welded in place between an upper portion of the channel section 39 and the bracket plate 31.

The bearing box 37 mounts a transversely extending front axle beam 47 for up and down swinging movements on a horizontal axis which extends centrally of the vehicle main body in the longitudinal direction of the latter and which is indicated by the dash-dotted line 48 in FIG. 6. The axle beam 47 is of tubular construction and in its mounted condition on the vehicle main body it presents an upper and a lower side in transversely extending relation to the axis 48. A central pivot of the axle beam 47 comprises a sleeve 49 which extends transversely of the axle tube through aligned holes in the latter and is rigidly secured therein as by welding. The sleeve 49 mounts a forwardly extending trunnion stub 51 and a rearwardly extending trunnion stub 52 in axial alignment with each other. The forward trunnion stub 51 has a conical rear portion which engages a corresponding conical seat in the forward end of the sleeve 49, and the rearward trunnion stub 52 has a conical forward portion which engages a corresponding conical seat in the rear portion of the sleeve 49. Nuts 54 and 56 on threaded opposite end portions of a tension rod 53 are drawn up against the trunnion stubs 51 and 52, respectively, so as to force the conical portions of the latter into firm engagement with sleeve 49. The tension rod 53 extends slidably through axial bores of the trunnion stubs 51 and 52 and it has an integral, radially enlarged center portion 55 which, in the assembled condition of the parts as shown in FIG. 6, is spaced axially from the inner ends of the trunnion stubs 51 and 52. Upon removal of the nuts 54, 56 from the rod 53 the latter may be driven axially, as with a hammer, so as to engage the center portion 55 with either of the trunnion stubs 51 and 52, and release the latter from their conical seats within the sleeve 49.

A cylindrical forward portion of the trunnion stub 51 is rotatably supported in a bearing housing 57 which is lined with a bearing sleeve 58 and which is secured to the front wall of the bearing box 37 by an annular series of bolts and nuts 59. The rearward trunnion stub 52 has a cylindrical portion which is rotatably supported in a bearing housing 61 which is lined with a bearing sleeve 62 and is secured to the bracket plate 31 by an annular series of bolts and nuts 63.

The axle beam 47 has opposite end pivots 64 and 66 for connection with a pair of wheel carriers 67 and 68, respectively. Each of the end pivots 64 and 66 comprises a pin which extends parallel to the central pivot axis 48 through a bearing boss 50 (FIG. 7) of the axle beam and through lower portions of front and rear wings 55 and 60 (FIG. 5) of the associated wheel carrier 67 or 68.

The wheel carrier 67 has an upper pivot 69 for connection with a guide link 71, and the wheel carrier 68 has an upper pivot 72 for connection with a guide link 73. The upper pivots 69, 72, like the lower pivots 64, 66, each comprise a pin which extends parallel to the central pivot axis 48 through a bearing boss 50′ (FIG. 7) of the associated guide link and through upper portions of the front and rear wings 55 and 60 (FIG. 5) of the associated wheel carrier 67 or 68. The guide links 71 and 73 extend inwardly toward a vertical plane which extends longitudinally of the vehicle through the pivot axis 48 and their relatively adjacent ends are hingedly connected together on a pivot pin 74 which extends parallel to and at a predetermined upward spacing from the axis 48. As shown in FIG. 6, the pivot pin 74 is mounted at its forward end in a hole of the brace 36 and at its rearward end in a hole of the plate 31. Collars 76 and 77 are secured to the opposite ends of the pin 74 so as to secure it against axial displacement relative to the plate 31 and brace 36. As shown in FIGS. 5 and 6, the guide link 71 has a forked bearing portion 78 which is journaled on the pin 74, and the guide link 73 has a bearing portion 79 journaled on the pin 74 and straddled by the forked bearing portion 78.

Figure 7:
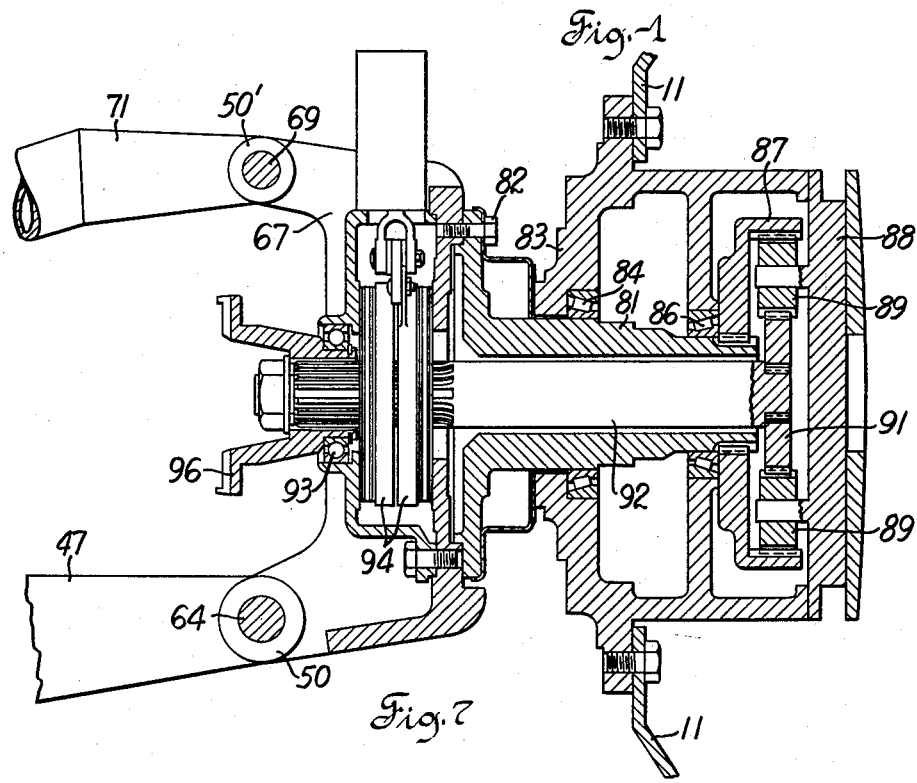
FIG. 7 is an enlarged section on line VII—VII of FIG. 2.

Referring to FIG. 7, the wheel carrier 67 mounts a hollow wheel spindle 81 which is rigidly secured to the carrier 67 by an annular series of bolts 82. The wheel 11 has a hub 83 which is rotatably mounted on the hollow spindle 81 by means of a pair of conical roller bearings 84 and 86. Nonrotatably secured to the axially outer end of the wheel spindle 81 is a ring gear 87, and a cap member 88 of the wheel hub 83 carries a set of planetary gear 89 in mesh with internal teeth of the ring gear 87. A sun gear 91 in mesh with the planetary gears 89 is nonrotatably secured to the axially outer end of a drive shaft 92 which extends axially through the hollow wheel spindle 81. The drive shaft 92 is rotatably mounted on the wheel carrier 67 by means of a ball bearing 93 and a brake mechanism 94 of conventional construction is operatively interposed between the wheel carrier 67 and the drive shaft 92. Propelling power for the wheel 11 is transmitted from the engine 9 to the drive shaft 92 by suitable mechanism (not shown) of conventional construction including a universal coupling 96 (FIG. 3) at the axially inner end of the drive shaft 92.

The foregoing explanations with respect to the wheel carrier 67 and the mechanism for transmitting power to the drive wheel 11 analogously apply to the wheel carrier 68 and the drive wheel 12.

Figure 3:
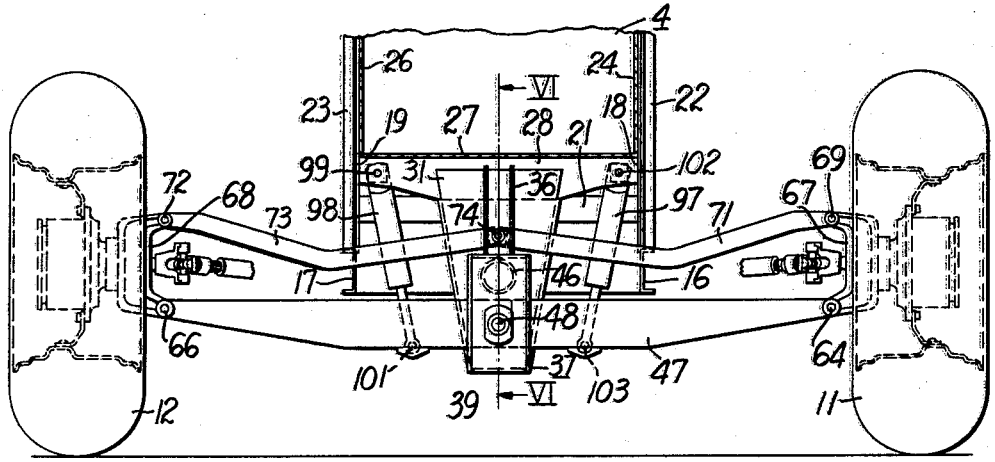
FIG. 3 is a front elevational view of a front axle structure and associated parts incorporated in the combine shown in FIG. 1, the view of FIG. 3 being taken partly in section on line III—III of FIG. 2.

In order to control lateral tilting of the main body of the combine about the pivot axis 48, a stabilizing mechanism including a pair of hydraulic cylinders 97 and 98 is operatively interposed between the main body and the axle beam 47 as shown in FIGS. 3, 5 and 6. The barrel portion of the hydraulic cylinder 98 is pivotally connected with the cross plates 28 and 29 in the space between the latter by means of a pivot pin 99, and the piston of the cylinder 98 is pivotally connected with the axle beam 47 by means of a pivot pin 101. The cylinder 97 is similarly connected at its upper end to the cross plates 28 and 29 by a pivot pin 102 and at its lower end to the axle beam 47 by means of a pivot pin 103.

The hydraulic cylinders 97 and 98 are double acting and form part of a conventional hydraulic system (not shown) for maintaining the main body of the combine vertical during hillside operation.

Referring to FIG. 8, the side sills 16 and 17 of the vehicle frame are connected at their rear ends by a cross brace 104, and a pair of rear corners posts 106 and 107 extend upwardly from the side sills 16 and 17, respectively.

Secured to the rear ends of the side sills 16 and 17 and to the cross brace 104 by gusset plates 110 and 111 are rearwardly converging channel beams 108 and 109, and a bearing box 112 is secured to the converging ends of the channel beams 108 and 109 between the upper and lower flanges of the latter. A tie plate 113 connects the channel beams 108 and 109 rearwardly of the bearing box 112 and forwardly of the cross beam 104.

Mounted within the bearing box 112 is a bearing sleeve 114, and a similar bearing sleeve 116 is mounted forwardly of the bearing sleeve 114 in the cross brace 104. The bearing sleeves 114 and 116 are aligned on a horizontal axis which is indicated in FIG. 10 by the dash-dotted line 117, and which extends centrally of the vehicle frame in the longitudinal direction of the latter. Rotatably mounted in the bearing sleeves 114 and 116 is a pivot tube 118 which has an abutment ring 119 in axial thrust transmitting relation with the bearing sleeve 114 at the rear end of the latter. A collar 121 forwardly of the bearing sleeve 114 is secured to the pivot tube 118 by screws 122 so as to secure the pivot tube 118 in axially fixed position relative to the bearing sleeves 114 and 116. A horizontal fore and aft extending channel 123 is mounted below the pivot tube 118 by means of vertical hanger plates 124 and 126 which are secured at their upper ends to the bearing sleeves 114 and 116, respectively, and are welded at their lower ends to the channel 123.

A box section rear axle beam 127 is rigidly connected as by welding at its center to a rearwardly extending end portion of the pivot tube 118. The axle beam 127 has opposite end pivots 128 and 129 for connection with wheel carriers 131 and 132, respectively. As shown in FIG. 9, the wheel carrier 131 has a lower pivot 133 for connection with a guide link 134 and the wheel carrier 132 has a lower pivot 136 for connection with a guide link 137. The guide links 134 and 137 extend inwardly toward a vertical plane through the axis 117 of the pivot tube 118 and they are hingedly connected together at their relatively adjacent ends by means of a pivot pin 138 on the channel 123. As shown in FIG. 10, the pivot pin 138 is removably secured by means of a cross pin 139 to a bushing 141 which is welded into a cutout of the channel 123. Each of the end pivots 128 and 129 of the rear axle beam 127, and each of the guide link pivots 133 and 136 comprises a pivot pin which extends parallel to the central pivot axis 117 of the rear axle beam 127. The relatively adjacent ends of the guide links 134 and 137 have bearing bosses 142 and 143 which are mounted side by side on the pivot pin 138, as shown in FIG. 10.

The right rear wheel carrier 132 mounts a steering knuckle 144 which in turn has a suitable spindle portion (not shown) for mounting the rear wheel 14. The left rear wheel carrier 131 mounts a similar steering knuckle 146 for mounting the rear wheel 13. Steering arms 147 and 148 extend forwardly from the steering knuckles 144 and 146 and are connected by reach rods 149 and 151, respectively, with a triangular steering rocker 152 on the channel 123. As shown in FIG. 10, the steering rocker 152 is mounted on a vertical pivot pin 153 which extends through a hole in the web of the channel 123 and through a hole in the tie plate 113. Suitable collars at the upper and lower ends of the pivot pin 123 secure the pin in axially fixed position.

The steering linkage comprising the rocker 152 and reach rods 149, 151 is conventional and adapted to accommodate vertical swinging movement of the rear axle beam 127 about the central pivot axis 117. An actuating link 154 is pivoted by means of a pin 156 to a side arm of the rocker 152. The actuating link 154 is connected by conventional linkage 157 (FIG. 1) with a steering wheel 158 at the operator's station 7.

FIGS. 3 and 5 show the condition of the front axle structure relative to the vehicle frame when the combine is operated on level ground, and FIGS. 8 and 9 illustrate the rear axle structure in a corresponding condition. During travel of the combine on level ground the front wheels 11 and 12 carry substantially equal portions of the weight of the vehicle body which is sustained by the front axle beam 47, and the rear wheels 13 and 14 likewise carry substantially equal portions of the weight of the vehicle body which is sustained by the rear axle beam 127.

FIG. 4 shows the condition of the front axle structure when the combine is operated on a hillside. As viewed by an operator on station 7 of the combine, the hillside as illustrated in FIG. 4 slopes upward to the left of the operator and downward to the right. Manual or automatic control of the hydraulic stabilizing system including the cylinders 97 and 98 causes swinging of the axle beam 47 relative to the vehicle body about its central fore and aft extending pivot axis 48 and corresponding movement of the uphill wheel 11 to the raised position, and of the downhill wheel 12 to the lowered position, as shown in FIG. 4. As a result of such swinging movement of the axle 47, the vehicle body will be maintained in a precise upright position to insure proper functioning of the operating mechanisms of the combine and especially of the separating and grain cleaning mechanisms. The wheel carriers 67 and 68 are maintained vertical by operation of the guide links 71 and 73 when the axle beam 47 swings about the pivot axis 48. Suitable mechanism, not shown, is operatively interposed between the header 1 and the axle beam 47, by which the header is swung about the axis of the swivel joint 3 into a laterally inclined position conforming with the slope of the hillside.

In the condition of the front axle structure as illustrated by FIG. 4, the uphill wheel 11 carries a larger portion of the weight of the vehicle body than the downhill wheel 12. This result is obtained by an arrangement of the end pivots 64 and 66 on the axle beam 47 in a common plane which extends parallel to and at a predetermined upward spacing from the pivot axis 48.

Figure 11:
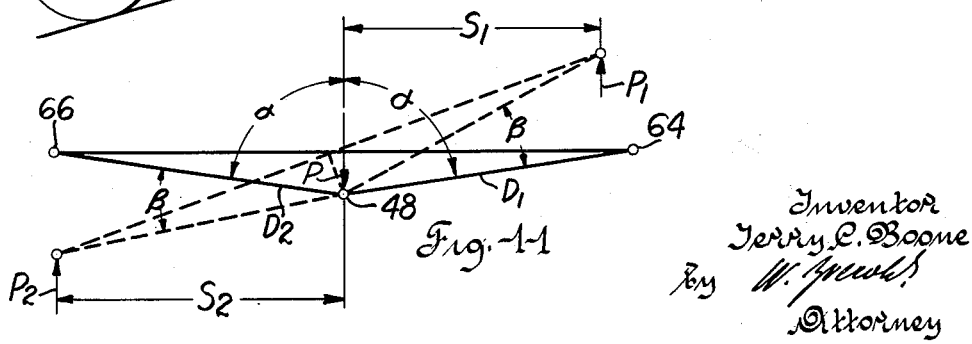
FIG. 11 is a geometrical diagram illustrating the operating principle of the front axle structure shown in FIG. 3, and of the rear axle structure shown in FIG. 9.

The arrangement of the end pivots 64 and 66 relative to the central fore and aft extending pivot axis 48 is diagrammatically illustrated by FIG. 11, and for purposes of clarification the vertical spacing of the common plane of the end pivots 64 and 66 from the pivot axis 48 is somewhat exaggerated in FIG. 11 as compared with the actual construction which is illustrated by FIGS. 3 and 4. The full line triangle 48, 64, 66 in FIG. 11 illustrates the position of the axle beam 47 during travel on level ground corresponding to FIG. 3, and the dotted line triangle in FIG. 11 illustrates the position of the axle beam 47 during travel on a hillside corresponding to FIG. 4. Designating the weight of the main body which is transmitted to the front wheels 11 and 12 by the letter P, and the reactive sustaining forces on the wheels 11 and 12 by the letters $P_1$ and $P_2$, respectively, the following relations will be apparent from FIG. 11:

$$P = P_1 + P_2 \qquad S_1 = D_1 \sin(\alpha - \beta) \qquad S_2 = D_2 \sin(\alpha + \beta)$$

wherein $S_1$ and $S_2$ are the lever arms of the forces $P_1$ and $P_2$, respectively; $D_1$ and $D_2$ the fixed and equal distances of the pivot centers 64 and 66 from the pivot axis 48; angle $\alpha$ one-half of the obtuse angle between $D_1$ and $D_2$; and angle $\beta$ the pivotal displacement of the axle beam 47 from its normal horizontal position. Equating the clockwise moment $P_1 S_1$ and the counterclockwise moment $P_2 S_2$, and solving for $P_1$ and $P_2$ with respect to P yields:

$$P_1 = \frac{P}{1 + \dfrac{\sin \alpha - \beta}{\sin \alpha + \beta}} \qquad (1)$$

$$P_2 = \frac{P}{1 + \dfrac{\sin \alpha + \beta}{\sin \alpha - \beta}} \qquad (2)$$

As a practical example, it may be assumed that the load P be 15,000 pounds, that the angle $\alpha$ be eighty degrees and that the axle beam 47 be tilted from its horizontal position through an angle $\beta$ of twenty degrees. As determined by Equation 1 above, the weight carried by the uphill wheel 11 under the assumed conditions will be about 8,000 pounds, and the weight carried by the downhill wheel 12 will be about 7,000 pounds.

Assuming, as another example, that the axle beam 47 be tilted through an angle of thirty degrees instead of twenty degrees, and leaving the assumed values for P and $\alpha$ unchanged, the weight carried by the uphill wheel will be about 7,950 pounds and the weight carried by the downhill wheel will be about 7,050 pounds. On the other hand, if it is assumed that the axle beam 47 swings only through an angle of ten degrees, instead of the previously assumed thirty and twenty degree angles, the weight carried by the uphill wheel will be about 7,750 pounds and the weight carried by the downhill wheel will be about 7,250 pounds.

From the foregoing it will apparent that the herein disclosed front axle structure is operative to impose substantially equal loads on the large size tires of the power driven front wheels 11 and 12 during travel of the combine on level ground and to increase the load on the tire at the uphill side and to proportionally decrease the load on the tire at the downhill side during hillside operation of the combine.

The critical spacing of the common plane of the end pivots 64 and 66 from the central, fore and aft extending pivot axis 48 of the vehicle body is fixed by the axle design and it may be chosen so as to suit existing requirements for weight transfer from the downhill to the uphill wheel during hillside operation of the combine. For the attainment of any such weight transfer it is necessary that the common plane of the pivots 64 and 66 be spaced upwardly from the pivot axis 48. An arrangement wherein the common plane of the end pivots 64 and 66 would be spaced downwardly from the central pivot axis 48 would result in a weight transfer from the uphill to the downhill wheel instead of the desired weight transfer from the downhill to the uphill wheel which is obtained by the arrangement as shown in FIGS. 3 and 4.

The foregoing explanations regarding the weight shift from the downhill to the uphill wheel on the front axle similarly apply to operation of the combine on a hillside of a slope opposite to that shown in FIG. 4; that is, on a hillside which slopes upwardly to the right and downwardly to the left of an operator on station 7. The heavier loading of the uphill wheel as afforded by the present invention has the effect of relieving the downhill wheel of some of its operation load and, therefore, minimizes the likelihood of a tire blowout or other failure of the running gear at the downhill side of the combine.

The power driven front supporting wheels 11 and 12 are equipped with pneumatic tires of relatively large size in accordance with conventional practice, and the steerable rear wheels 13 and 14 are also equipped with pneumatic tires, but of considerably smaller size than the tires of the front wheels 11 and 12. A tire blowout or other failure of the relatively small rear wheel at the downhill side of the combine would normally be less dangerous than tire blowout at the relatively large downhill front wheel of the combine. Nevertheless, the same weight shifting principle which is incorporated in the front axle structure as shown in FIGS. 3 and 4 is also incorporated in the rear axle structure as shown in FIG. 9. A common plane through the end pivots 128 and 129 of the rear axle beam 127 is indicated in FIG. 9 by the dash-dotted line 159 and this plane extends parallel to and is spaced upwardly from the fore and aft extending central pivot axis 117 of the vehicle body on the rear support. Accordingly, when the combine operates on a hillside and the front axle beam 47 assumes the tilted position shown in FIG. 4, the rear axle beam 127 will assume a similarly tilted position and the rear wheel at the uphill side of the combine will carry a heavier load than the rear wheel at the downhill side of the combine.

In general terms, the herein disclosed hillside combine is of the type having a main body and articulated supporting means therefore adapted to maintain said main body upright on level and laterally sloping ground. In the illustrated embodiment of the invention the articulated supporting means include the front and rear axle beams 47 and 127, respectively; the front wheels 11, 12; the rear wheels 13, 14; and the stabilizing system including the hydraulic cylinders 97, 98 for maintaining the vehicle body upright during travel on laterally sloping ground as well as on level ground. As explained in connection with FIG. 11, the articulated supporting means for the vehicle body are automatically operative upon movement of the supporting wheels at opposite sides of the main body to uphill and downhill positions, respectively, to shorten and lengthen the spacings of the upward and downward moving wheels, respectively, from a vertical plane which extends centrally of the vehicle body in the longitudinal direction of the latter.

It will also be noted that the herein disclosed front axle structure as well as the herein disclosed rear axle structure represents vertically and laterally adjustable weight transmitting means which are operatively interposed between the vehicle body and a pair of supporting wheels at opposite sides thereof, so that said wheels, during travel of the vehicle on level ground, will carry substantially equal portions of the weight of the vehicle body, and so that during hillside travel of said vehicle the uphill wheel will carry a larger portion of said weight than the downhill wheel.

While in the foregoing a preferred embodiment of the invention has been shown and described, it should be understood that it is not intended to limit the invention to the illustrated details of construction but that the invention includes such other forms and modifications as are embraced by the scope of the appended claim.

Having now particularly described and ascertained the nature of my said invention and the manner in which it is to be performed, I declare that what I claim is:

In a hillside combine of the type wherein a body structure mounting a header and threshing mechanism is pivotally supported for lateral tilting adjustment on a parallelogram type axle structure mounting a pair of pneumatically tired front driving wheels and on a rearward steering truck, said axle structure comprising a pair of transversely spaced upright wheel carriers rotatably mounting said driving wheels, respectively; an axle beam having opposite pivotal supporting connections with said wheel carriers in a transverse plane, pivot means connecting said axle beam midway between said pivotal connections with said body structure on a horizontal axis which extends lengthwise of said body structure and in downwardly spaced relation to said transverse plane; link means extending transversely between said wheel carriers and pivotally connected thereto and to said body structure so as to maintain said wheel carriers upright during rocking movement of said axle beam about said horizontal axis; and hydraulic cylinder means operatively interposed between said body structure and said axle beam for maintaining the later in selected positions of pivotal adjustment about said horizontal axis, whereby said driving wheels will carry substantially equal portions of the weight of said body structure during travel of said combine on level ground, and during hillside operation the portion of said weight carried by the driving wheel at the uphill side will be greater than the portion of said weight carried by the driving wheel at the donwhill side of said combine.

References Cited in the file of this patent

UNITED STATES PATENTS

| 2,821,059 | Heitshu | Jan. 28, 1958 |

FOREIGN PATENTS

| 540,947 | Italy | Mar. 16, 1956 |
| 1,194,819 | France | May 11, 1959 |